United States Patent [19]

Sichel

[11] Patent Number: 4,855,985

[45] Date of Patent: Aug. 8, 1989

[54] DIGITAL STORAGE

[75] Inventor: Enid K. Sichel, Lincoln, Mass.

[73] Assignee: Masschusetts Institute Of Technology, Cambridge, Mass.

[21] Appl. No.: 73,148

[22] Filed: Jul. 14, 1987

[51] Int. Cl.$^4$ .......................... G11B 7/00; G02B 7/02
[52] U.S. Cl. .................................. 369/100; 346/76 L
[58] Field of Search ............... 369/100, 101, 108, 109, 369/110, 275; 346/76 L, 135

[56] References Cited

U.S. PATENT DOCUMENTS

| | | | |
|---|---|---|---|
| 2,663,654 | 12/1953 | Miller et al. | 117/36 |
| 2,663,655 | 12/1958 | Miller et al. | 117/36 |
| 2,663,656 | 12/1953 | Miller et al. | 117/36 |
| 2,663,657 | 12/1953 | Miller et al. | 117/36 |
| 3,179,614 | 4/1965 | Edwards | 260/30.2 |
| 3,689,894 | 9/1972 | Laura et al. | 340/172.5 |
| 3,893,129 | 7/1975 | Endo et al. | 346/77 |
| 4,090,031 | 5/1978 | Russell | 369/108 X |
| 4,195,312 | 3/1980 | Bell et al. | 179/100 |
| 4,195,313 | 3/1980 | Bell et al. | 179/100 |
| 4,216,501 | 8/1980 | Bell | 358/128.5 |
| 4,284,716 | 8/1981 | Drexler et al. | 430/510 |
| 4,285,056 | 8/1981 | Bell | 369/100 |
| 4,286,250 | 8/1981 | Sacchetti | 338/306 |
| 4,405,993 | 9/1983 | Kahn et al. | 369/109 X |
| 4,425,527 | 1/1984 | Sichel | 313/112 |
| 4,447,899 | 5/1984 | Geyer et al. | 369/94 |
| 4,577,306 | 3/1986 | Howe et al. | 369/286 |
| 4,584,456 | 4/1986 | Oodaira et al. | 219/121 |

FOREIGN PATENT DOCUMENTS 62-130890 4/1987 Japan.
62-74692 6/1987 Japan.
62-124987 6/1987 Japan.

OTHER PUBLICATIONS

Brom et al., "On a New Conducting Polymer-Pyrolyzed Kapton", Solid States Communications, vol. 35, pp. 135-139.

Sichel, et al., "Electrical Conduction In A Heat--Treated Polyimide", Solid State Communications, vol. 41, No. 10 pp. 747-749, 1982.

Gittleman, J. et al., "Are Pyrolyzed Polyimides Conducting Polymers?", Journal of Electronic Materials, vol. 10, No. 2, 1981, pp. 329-336.

Burger, A. et al., "Polyimides as Precursors for Artificial Carbon", Carbon 13, 149 (1975), pp. 149-157.

Howe, Dennis et al., "Digital Optical Recording in Infrared-Sensitive Organic Polymers", Preceedings, SPIE vol. 382, Optical Data Storage Dichen Chairman/Editor, Jan. 17-20, 1983, pp. 103-115.

Bell, Alan, "Optical Data Storage Technology Status and Prospects", Computer Design, Jan. 1983, pp. 133-146.

RCA Review, vol., 39, No. 1, Mar. 1978, pp. 1-228.

Primary Examiner—William L. Sikes
Assistant Examiner—Akm E. Ullah

[57] ABSTRACT

A recording system for representing digital information in the form of marks and the absence of marks at a plurality of locations, each mark being formed in response to energy delivered by an optical beam; the device includes a material configured in a form to receive the beam at selected locations for forming the marks, the material being characterized by undergoing pyrolysis to form the marks at the selected locations in response to the energy.

23 Claims, 1 Drawing Sheet

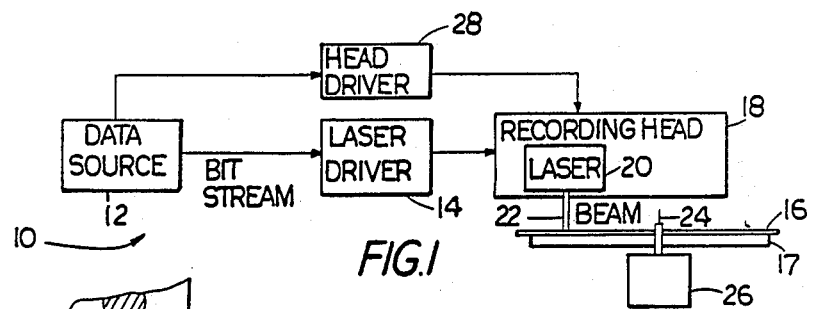
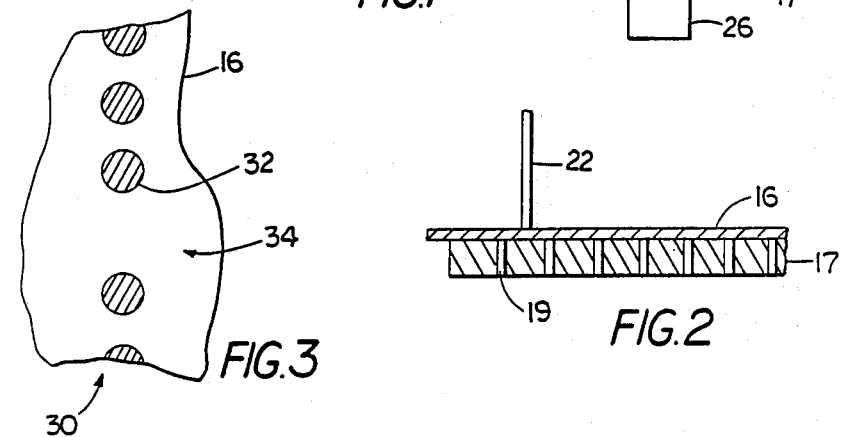
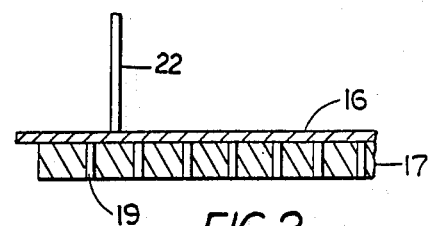
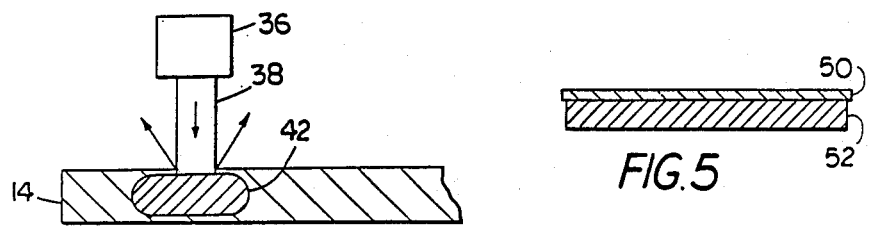
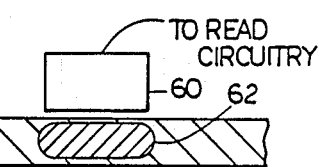
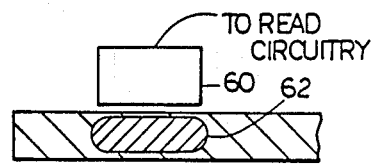

DIGITAL STORAGE

BACKGROUND OF THE INVENTION

This invention relates to storing digital information on a storage medium.

In some known optical storage schemes, a laser beam records the value of a digital bit either by ablating or not ablating a pit in a polymer film. The film may be part of a disk which is rotated relative to a recording head that includes the laser. A stream of bits may then be recorded along each one of successive circular tracks by modulating the laser beam (in accordance with the bit stream) in coordination with the rotation of the disk and with movement of the recording head relative to the disk. The difference in the optical characteristics of the ablated pit compared with a nonablated region enables the stored bits to be read optically by any one of a variety of techniques. Such a recording scheme may be capable of very high density storage, e.g., $10^8$ bits per $cm^2$ or more.

Typically the disk is assembled of multiple layers, one of which absorbs laser beam energy sufficiently to become ablated. That layer may be sandwiched between other layers that provide mechanical strength and certain optical properties. For example an under layer may be reflective, while an over layer may be antireflective, thus enabling reading the bits using a laser beam. Reflection of the beam indicates an ablated pit; no reflection indicates that the beam has been absorbed in a non-ablated region.

In some schemes, the laser sensitive layer has a low melting point and the bit is recorded by melting a tiny spot of that layer. The layer may include a dye that specifically absorbs light at the frequency of the recording layer. Alternatively, a thermoplastic layer may be deformed rather than ablated. Photosensitive layers similar to photographic film have also been used.

SUMMARY OF THE INVENTION

A general feature of the invention provides a recording system for representing digital information in the form of marks or the absence of marks at a plurality of locations, each mark being formed in response to energy delivered by an energy-carrying beam; the system includes a beam source, and a material configured in a form to receive the beam at selected locations for forming the marks, the material being characterized by undergoing pyrolysis to form the marks at the selected locations in response to the energy.

Preferred embodiments include the following features. The system includes a recording device having a controllable source for the energy-carrying beam for forming the marks at the selected locations, and a reading device for detecting the marks to retrieve the digital information. The material is transparent and electrically insulative and the marks are opaque and electrically conductive. The marks comprise carbon residues. The material is a polymer having a backbone of recurring aromatic units that pyrolyze to form non-volatile carbonaceous residues, e.g., a polyimide formed as a single homogeneous disk either not permanently attached to any other supporting material or permanently attached to a supporting substrate. In the former case the material may be temporarily supported on another material for reading. The energy-carrying beam of the recording device may be optical (e.g., a laser beam), or non-optical (e.g., an electron beam). The reading device may include a laser or a sensor for electrically conductive material.

Because the polyimide is highly resistant to heat, light, oxygen, and solvents, the recorded disk is suitable for long term archiving of data. The recorded bits may be read not only optically, but also electrically. The recording medium may be fabricated as a single homogeneous layer because the polyimide combines in one material the mechanical strength and all of the optical and electrical properties required, thus reducing the cost of fabrication. The polyimide is easy to fabricate and relatively inexpensive.

The invention is useful for, among other things, write-once computer memories, digitized photographic images, archival storage, and home videodisks.

Other advantages and features will become apparent from the following description of the preferred embodiment, and from the claims.

DESCRIPTION OF THE PREFERRED EMBODIMENT

We first briefly describe the drawings.

FIG. 1 is a block diagram of an optical disk recording system.

FIG. 2 is a cross sectional view of the disk mounted on a vacuum plate for recording or reading.

FIG. 3 is an enlarged top view of a fragment of the recording disk.

FIG. 4 is a cross sectional view of the disk being read transmissively.

FIG. 5 is a cross-sectional view of the disk mounted on a supporting substrate.

FIG. 6 is a cross-sectional view of a portion of the disk being read capacitively.

STRUCTURE

Referring to FIG. 1, in a data recording system 10, a data source 12 delivers a stream of bits to a laser driver 14 for recording on a disk 16. For that purpose, laser driver 14 is connected to a recording head 18 that includes a laser 20 (e.g., an Nd:YAG frequency doubled, green light laser) whose beam 22 causes the recording of the bits. Recording head 18 also includes a conventional mechanism (not shown) for moving the laser beam 22 to a succession of circular tracks centered on the axis 24 of disk 16. A motor 26 causes disk 16 to rotate at a fixed speed. The movement of beam 22 is controlled by a head driver under direction from the data source so that the bits are recorded in predetermined locations along successive tracks of the disk.

Disk 16 is fabricated as a single flexible homogeneous $10^{-4}$ inch thick element by depositing a polyamic solution in any one of several conventional ways (e.g., molding, spinning, spreading, or spraying), then imidizing the deposited solution by heating to a temperature of about 200° C. in air. The resulting disk is orange. Polyimides are available both as finished films and as polyamic acid solutions from, e.g., DuPont (Kapton ® and Pyralin ®), Ciba-Geigy, and General Electric. Kapton, for example, has the chemical formula $C_{22}N_2O_5$.

High purity of the polyimide material is important for high density recording. In particular, any impurities must be smaller in size than the size of the recording marks to be made, e.g., on the order of 4000 angstroms. Furthermore the impurities should not be spaced closer than the size of the marks to be made.

Referring to FIG. 2, for purposes of recording, the flexible disk 16 may be supported and held in place on a supporting plate 17 having an array of vacuum holes 19 connected to a vacuum line (not shown).

Referring to FIG. 3, the disk 16 is organized as a large number of concentric tracks 30 each of which has a sequence of bit positions. Each bit position may either be "written" by a laser generated mark 32 to record a 1 valued bit or left unmarked 34 to record a 0 valued bit.

Each mark (which is black) is formed by a process of pyrolysis in which the energy from the laser beam causes a heat-driven chemical change (a breaking apart of complex molecules into simpler units) in the polyimide that forms the disk. The mark is not formed by melting, burning, or ablating in the usual sense. The chemical products of the pyrolysis are described in Burger, et al., "Polymides as Precursors for Artificial Carbon," Carbon 13, 149 (1975), incorporated herein by reference.

Other materials may be used for the recording medium, provided that they pyrolyze to form a mark which is optically distinguishable from the unpyrolyzed medium. In particular materials which pyrolyze to form carbon residues, and especially those which do so efficiently with a minimum production of volatile by-products would be useful. Preferable materials are those polymers having backbones of recurring aromatic units that form non-volatile carbonaceous residues upon pyrolysis, more preferably aromatic polyimides, aromatic polyamides, polybenzimidazoles, polybenzoxazoles, polybenzothiazoles, polyoxadiazoles, polytriazoles, polyimidazopyrrolones, aromatic polysulfones, and polyphenylene sulfide, most preferably polyimides. It is useful for the materials to be non-flowing during the pyrolysis and to have the archival qualities of polyimides.

The diameter of the mark is determined by the laser beam diameter (which may be as small as submicron), the pulse energy, pulse duration and the power dissipated during the pulse. The power dissipated during the pulse is much greater than the average laser power. The energy density needed to generate the mark is on the order of 8 joules/cm$^2$ for a film of thickness 0.005 inch which generated pyrolysis through the full thickness of the orange Kapton film. In one test, a double track of marks of 25 microns diameter each were produced simultaneously with a laser average power of 25 milliwatts with a duty cycle of 250 hertz. Pulsed lasers of the type used typically have pulse widths about $2 \times 10^{-8}$ seconds. The energy density expended on each mark was about 8 joules/cm$^2$ in a Kapton film 0.005 inches thick.

Each mark is optically dense relative to the transparency of unmarked regions.

Referring to FIG. 4, this enables the disk to be read using a conventional transmission approach in which a laser 36 directs a read beam 38 toward disk 14. A photodetector 40 is positioned below the disk to receive beam 38 if it is not obstructed. When the beam is blocked by a mark 42, as shown, the output of the detector 40 is reduced. Thus read circuitry, not shown, can detect the stored digital information based on the location of the read head (on which laser 36 is mounted) relative to the disk and on the rotational position of the disk.

Other embodiments are within the following claims.

For example, the recording medium could be in the form of a card (raster-scanned by the read out laser) or tape. Referring to FIG. 5, the polyimide film could be a thin film 50 permanently deposited on a supporting substrate 52 or not permanently attached to any other supporting material but temporarily supported on a vacuum surface (as in FIG. 2) to hold it in place for reading. The supporting substrate 52 may be transparent, reflecting, or opaque, and could be grooved for tracking purposes (or the tracking information may be recorded on the medium). An overcoat may be superimposed on the medium to protect it and/or provide desired optical features. The medium may be read reflectively (rather than transmissively) by providing a reflective layer beneath the polyimide layer. The marks could be made by any energy source with sufficient power density and sufficiently small beam size, e.g., a laser diode emitting light in the green wavelength region. The medium may be read by a common laser diode.

Referring to FIG. 6, the marks on the medium, being carbon based, are electrically conductive (while the unmarked medium is electrically insulative) and may therefore be read electrically by a capacitance detecting stylus 60 which includes an electrode that capacitively couples with mark 62.

The marks may be written by a focused electron beam.

The medium can be held by an electrostatic support rather than a vacuum plate.

I claim:

1. A recording system for representing digital information in the form of marks or the absence of marks at a plurality of locations, comprising
   a source for delivering an energy-carrying beam, and
   a material configured in a form to receive said beam at selected locations for forming said marks, said material being characterized by undergoing pyrolysis to form said marks at said selected locations in response to energy of appropriate levels being received at said locations,
   said source being controlled to cause said beam to carry said appropriate levels of energy to said selected locations.

2. The system of claim 1 further comprising a reading device for detecting said marks at said locations to retrieve said digital information.

3. The system of claim 1 wherein said material is transparent and said marks are opaque.

4. The system of claim 1 wherein said material is electrically insulative and said marks are electrically conductive.

5. The system of claim 1 wherein said marks comprise carbon residues.

6. The system of claim 1 wherein said material comprises a polymer having a backbone of recurring aromatic units that pyrolyze to form non-volatile carbonaceous residues.

7. The system of claim 1 wherein said material comprises a polyimide.

8. The system of claim 1 wherein said form in which said material is configured comprises a disk.

9. The system of claim 1 wherein said material is configured as a single homogeneous element not permanently attached to any other supporting material.

10. The system of claim 1 further comprising a supporting substrate on which said material is permanently mounted.

11. The system of claim 1 wherein said material is adapted to be temporarily supported on another material for reading.

12. The system of claim 1 wherein said energy-carrying beam is optical.

13. The system of claim 1 wherein said energy-carrying beam is non-optical.

14. The system of claim 1 wherein said recording device comprises a laser.

15. The system of claim 1 wherein said recording device comprises an electron beam.

16. The system of claim 3 wherein said reading device comprises a laser.

17. The system of claim 2 wherein said reading device comprises, an electrically conductive material sensor.

18. A method of recording digital information in the form of marks or the absence of marks at a plurality of locations comprising provided a material which pyrolyzes to form a mark when exposed to an energy-carrying beam of an appropriate energy level, said material being configured in a form to receive said beam at selected location for forming said mark, and exposing said material to an energy-carrying beam having said appropriate energy level to pyrolyze said material to form marks in accordance with said digital information.

19. The method of claim 18 wherein
said step of exposing comprises causing said energy-carrying beam to be delivered as beam pulses.

20. The method of claim 19 wherein
said pulses have pulse widths smaller than $10^{-7}$ seconds.

21. The method of claim 20 wherein
each said mark is formed by said beam pulses delivering energy with a density of at least 5 joules/cm$^2$.

22. The system of claim 14 wherein said laser is a green light laser and said material is orange polyimide.

23. A method of recording digital information comprising providing a recording layer comprising an orange polyimide;

directing a green-light pulsed laser beam toward successive locations of said recording layer, said pulsed laser beam delivering energy with a density of at least 5 joules/cm$^2$ and modulating the laser beam to cause or not cause pyrolysis at the successive locations in accordance with said digital information.

* * * * *